(12) United States Patent
Isago et al.

(10) Patent No.: US 6,717,784 B2
(45) Date of Patent: Apr. 6, 2004

(54) RUSH CURRENT SUPPRESSION CIRCUIT

(75) Inventors: Tomiyasu Isago, Kawasaki (JP); Naoki Takahashi, Kawasaki (JP); Yoshinori Usui, Kawasaki (JP); Tatsuo Araki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/107,529

(22) Filed: Mar. 26, 2002

(65) Prior Publication Data
US 2003/0075988 A1 Apr. 24, 2003

(30) Foreign Application Priority Data
Oct. 22, 2001 (JP) ........................................ 2001-323281

(51) Int. Cl.$^7$ ................................................ H02H 9/00
(52) U.S. Cl. ..................... 361/58; 361/56; 361/93.3; 361/119; 361/106; 323/222; 323/282
(58) Field of Search ..................... 361/58, 106, 110, 361/111, 93, 94, 56, 93.1, 93.3, 85, 87, 119, 118; 323/222, 282

(56) References Cited
U.S. PATENT DOCUMENTS 3,935,527 A * 1/1976 Michelet et al.
5,122,724 A * 6/1992 Criss
5,187,653 A * 2/1993 Lorenz
5,374,887 A * 12/1994 Drobnik
5,850,337 A * 12/1998 Lee

* cited by examiner

Primary Examiner—Dean A. Reichard
Assistant Examiner—Nguyen T. Ha
(74) Attorney, Agent, or Firm—Katten Muchin Zavis Rosenman

(57) ABSTRACT

A rush current suppression circuit is used with a power supply circuit which includes a common line and an input voltage detection circuit and supplies power from an input power supply via a switching circuit. There is provided a smoothing capacitor coupled to an output end of the power supply circuit, and a rapid discharge and delay circuit coupled to the input voltage detection circuit and carrying out a rapid discharge and a time delay and controlling the switching circuit. The switching circuit includes two FETs which are coupled in series to the common line, and the two FETs have sources which are coupled to each other and gates which are coupled to each other and driven by the rapid discharge and delay circuit.

10 Claims, 5 Drawing Sheets

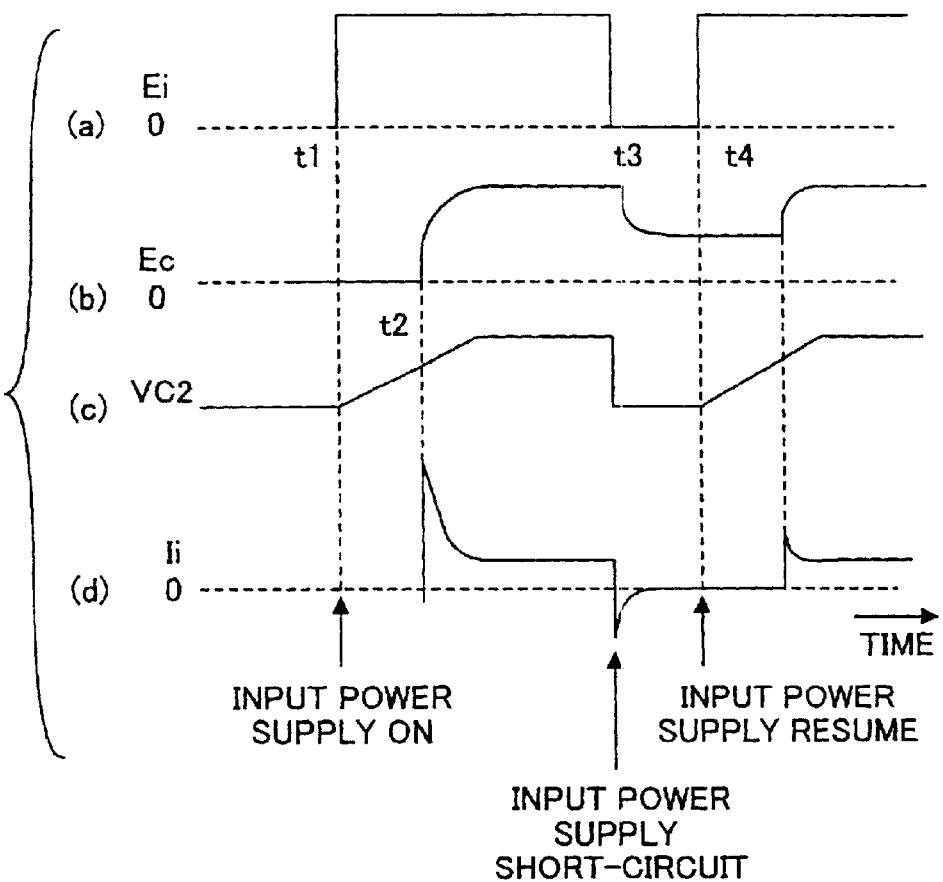

RUSH CURRENT SUPPRESSION CIRCUIT

BACKGROUND OF THE INVENTION

This application claims the benefit of a Japanese Patent Application No.2001-323281 filed Oct. 22, 2001, in the Japanese Patent Office, the disclosure of which is hereby incorporated by reference.

1. Field of the Invention

The present invention generally relates to rush current suppression circuits, and more particularly to a rush current suppression circuit for a power supply.

In electronic equipments which handle electronic information, there are demands to reduce voltages and to increase currents, in large scale integrated circuits (LSIs). In addition, there are demands to reduce the size and to improve the efficiency of power supply units which supply power to such LSIs.

2. Description of the Related Art

FIG. 1 is a circuit diagram showing an example of a conceivable rush current suppression circuit. In FIG. 1, Ei denotes an input power supply or input power supply voltage, Ec denotes an output voltage, and a reference numeral 1 denotes a load with respect to a power supply circuit. In the power supply circuit, a field effect transistor FET1 is inserted in series to a loop of the circuit, a resistor R1 has one end thereof connected to an output line, and a Zenner diode ZD1 is connected in series to the resistor R1. An anode of the Zenner diode ZD1 is connected to a gate G of the transistor FET1.

A smoothing capacitor C1 is connected to an output end of the power supply Ei. A rapid discharge and delay circuit 2 has one end thereof connected to the anode of the Zenner diode ZD1, and the other end thereof connected to a common line of the power supply Ei.

The rapid discharge and delay circuit 2 includes a diode D1, a transistor TR1 having an emitter thereof connected to a cathode of the diode D1, a resistor R3 connected between a collector of the transistor TR1 and the common line, and a resistor R2 having one end thereof connected to a base of the transistor TR1 and the other end thereof connected to the common line. The base of the transistor TR1 and an anode of the diode D1 are connected by a node which connects to the anode of the Zenner diode ZD1.

A description will now be given of the operation of the power supply circuit shown in FIG. 1, by referring to FIG. 2. FIG. 2 is a timing chart for explaining signal waveforms at various parts of the circuit shown in FIG. 1. In FIGS. 2, (a) shows the input power supply voltage Ei, (b) shows the output voltage Ec, (c) shows a voltage VC2 applied to the capacitor C2 (or a gate voltage VGS of the transistor FET1), and (d) shows a load current Ii.

(1) When Input Power Supply Voltage Ei Is Applied:

When the input power supply voltage Ei is applied to the circuit at a time t1 as shown in FIG. 2(a), the input power supply voltage Ei is applied to the gate G of the transistor FET1 via the resistor R1 and the Zenner diode ZD1. At the same time, the voltage VC2 applied on the capacitor C2 of the rapid discharge and delay circuit 2 gradually increases as shown in FIG. 2(c) because charges are gradually supplied to the capacitor C2. The voltage VC2 of the capacitor C2 is applied to the transistor FET1 as the gate voltage VGS.

When the gate voltage VGS exceeds a level which turns the transistor FET1 ON at a time t2, the transistor FET1 turns ON as shown in FIG. 2(b). Hence, a rush current is suppressed by turning ON the transistor FET1 after a delay time from the time t1 when the input power supply voltage Ei is applied. As a result, a charging current starts to flow to the smoothing capacitor C1, and the output voltage Ec increases as shown in FIG. 2(b). Consequently, an excessively large rush current flows as the load current Ii, as shown in FIG. 2(d).

(2) When Instantaneous Cutoff of Input Power Supply (Instantaneous Short-Circuit Failure of Input Power Supply Ei) Occurs:

At a time t3 shown in FIG. 2(a), both ends of the input power supply Ei are short-circuited and the input power supply voltage Ei becomes zero. In this state, the charge accumulated in the smoothing capacitor C1 is discharged. A discharge loop of this discharge includes the input power supply Ei and an internal diode of the transistor FET1, that is, a body diode of the transistor FET1 indicated by a dotted line in FIG. 1. When the charge of the smoothing capacitor C1 is discharged, a peak current flows in a reverse direction as shown in FIG. 2(d) in the load current Ii at the time of the instantaneous cutoff of the input power supply Ei.

At the same time, when the charged voltage of the smoothing capacitor C1 becomes less than or equal to a Zenner voltage of the Zenner diode ZD1, the transistor TR1 of the rapid discharge and delay circuit 2 turns ON. Hence, the rapid discharge and delay circuit 2 operates as a rapid discharge circuit, and rapidly discharges the charge accumulated in the capacitor C2. As a result, the gate voltage VGS is rapidly discharged to zero as shown in FIG. 2(c), to thereby turn OFF the transistor FET1.

(3) When Input Power Supply Resumes Power:

It is assumed that the power of the input power supply Ei resumes power from a time t4. Since the voltage applied across both ends of the smoothing capacitor C1 is approximately zero in this state, the operation from the time t4 when the input power supply Ei resumes power becomes the same as the operation when the input power supply voltage Ei is newly applied. Accordingly, a voltage having the same voltage as the input power supply Ei is applied to the smoothing capacitor C1, and the rush current having the same value as the case (1) described above flows.

At the time of the instantaneous cutoff of the input power supply Ei, the charge accumulated in the smoothing capacitor C1 is discharged via the discharge loop via the body diode of the transistor FET1, to thereby rapidly reduce the charge of the capacitor C1. For this reason, when the input power supply Ei resumes power, the input power supply voltage Ei is directly applied to the smoothing capacitor C1 when the input power supply Ei resumes power, and the excessively large rush current flows. The flow of such an excessively large rush current is undesirable for the input power supply Ei and for the electronic equipments which uses the input power supply Ei. There is also a possibility that the rush current will affect other apparatuses undesirably.

SUMMARY OF THE INVENTION

Accordingly, it is a general object of the present invention to provide a novel and useful rush current suppression circuit in which the problems described above are eliminated.

Another and more specific object of the present invention is to provide a rush current suppression circuit which prevents an excessive decrease in a voltage of a smoothing capacitor, and prevent flow of an excessively large current.

Still another object of the present invention is to provide a rush current suppression circuit adapted to a power supply circuit which includes a common line and an input voltage detection circuit and supplies power from an input power supply via a switching circuit, comprising a smoothing capacitor coupled to an output end of the power supply circuit; and a rapid discharge and delay circuit, coupled to the input voltage detection circuit, carrying out a rapid discharge and a time delay and controlling the switching circuit, where the switching circuit includes first and second field effect transistors which are coupled in series to the common line of the power supply circuit, and the first and second field effect transistors have sources which are coupled to each other and gates which are coupled to each other and driven by the rapid discharge and delay circuit. According to the rush current suppression circuit of the present invention, it is possible to prevent an excessive decrease in a voltage of the smoothing capacitor, and prevent flow of an excessively large current.

A further object of the present invention is to provide a rush current suppression circuit connectable to a power supply circuit which is provided with a common line and an input voltage detection circuit and supplies power from an input power supply, comprising a smoothing capacitor which is coupled to an output end of the power supply circuit; a rapid discharge and delay circuit which is coupled to the input voltage detection circuit and carries out a rapid discharge and a time delay; and a switching circuit through which the power from the input power supply is supplied under control of the rapid discharge and delay circuit, where the switching circuit includes first and second field effect transistors which are coupled in series to the common line of the power supply circuit, and the first and second field effect transistors have sources which are coupled to each other and gates which are coupled to each other and driven by the rapid discharge and delay circuit. According to the rush current suppression circuit of the present invention, it is possible to prevent an excessive decrease in a voltage of the smoothing capacitor, and prevent flow of an excessively large current.

Other objects and further features of the present invention will be apparent from the following detailed description when read in conjunction with the accompanying drawings.

BRIEF DESCRIPTION OF THE DRAWINGS

FIG. 5 is a timing chart for explaining signal waveforms at various parts of a power supply circuit shown in FIG. 4.

DESCRIPTION OF THE PREFERRED EMBODIMENTS

Figure 1:
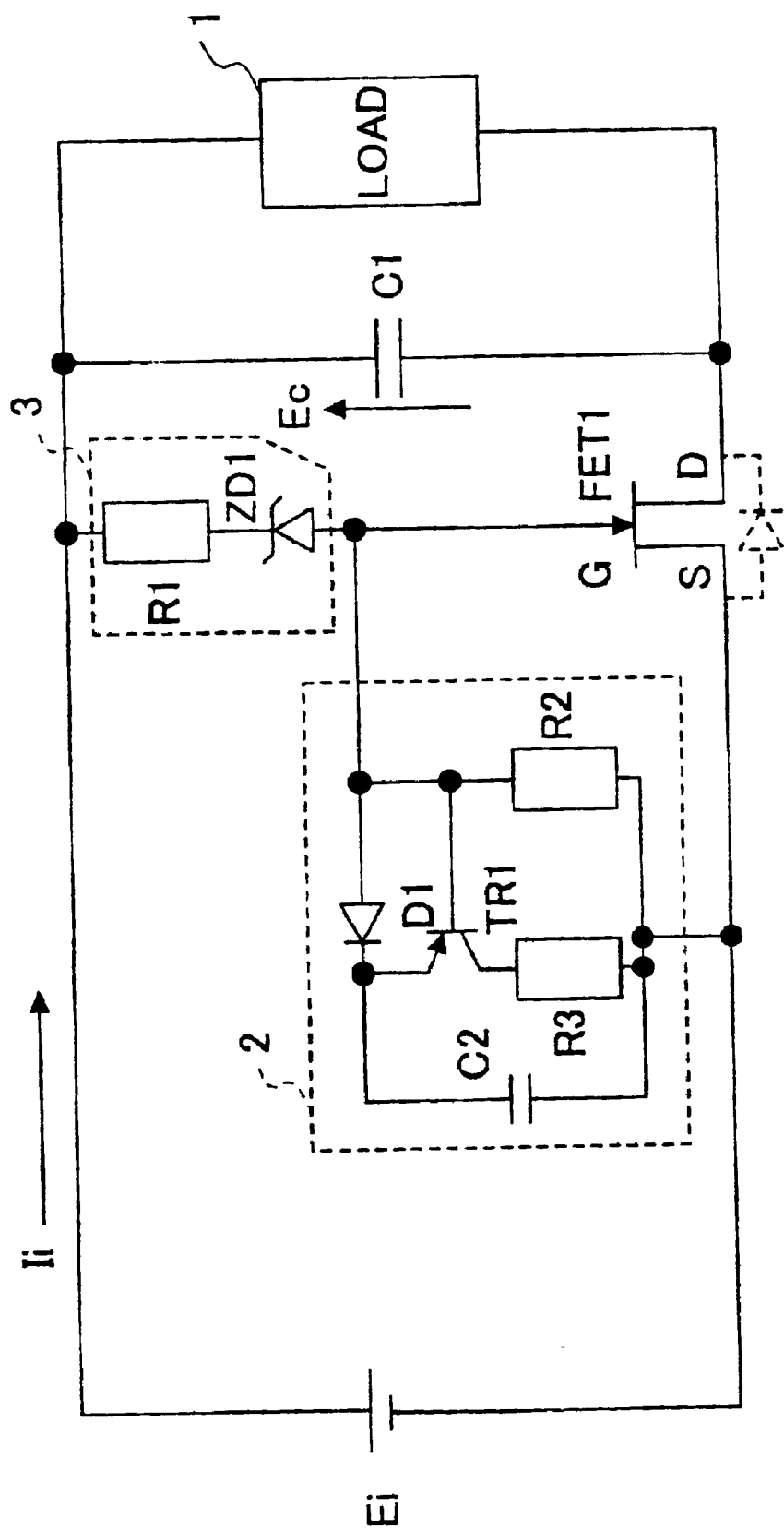
FIG. 1 is a circuit diagram showing an example of a conceivable rush current suppression circuit.
Figure 3:
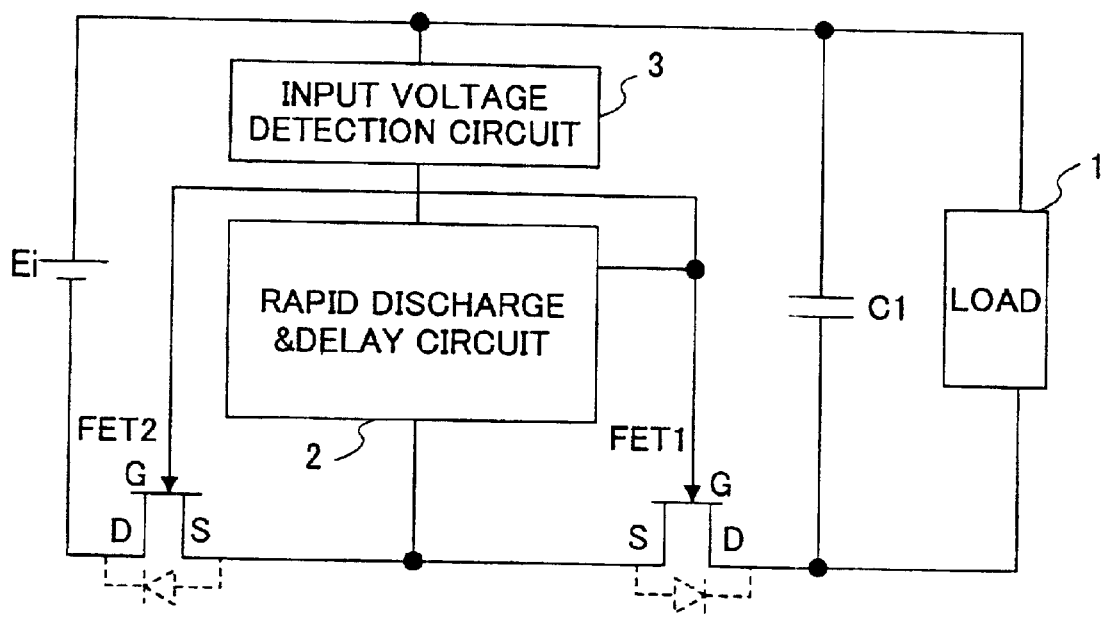
FIG. 3 is a diagram for explaining the operating principle of a rush current suppression circuit according to the present invention.

First, a description will be given of the operating principle of a rush current suppression circuit according to the present invention, by referring to FIG. 3. FIG. 3 is a diagram for explaining the operating principle of the rush current suppression circuit according to the present invention. In FIG. 3, those parts which are the same as those corresponding parts in FIG. 1 are designated by the same reference numerals, and a description thereof will be omitted.

A power supply circuit shown in FIG. 3 supplies power from an input power supply Ei to a load 1 via a switching circuit. In FIG. 3, a smoothing capacitor C1 is connected to an output end of the power supply circuit, and a load 1 is provided with respect to the power supply circuit. An input voltage detection circuit 3 is connected to the input power supply Ei, and detects an input voltage. A rapid discharge and delay circuit 3 is connected to the input voltage detection circuit 3, and carries out a rapid discharge, a time delay, and control of the switching circuit. Field effect transistors FET1 and FET2 are connected in series to a common line of the power supply circuit, and form the switching circuit which is driven by the rapid discharge and delay circuit 2. Gates G of the transistors FET1 and FET2 are connected, and Sources S of the transistors FET1 and FET2 are connected. A drain D of the transistor FET1 is connected to the other end of the input power supply Ei, and a drain D of the transistor FET2 is connected to the other end of the smoothing capacitor C1.

By connecting the two transistors FET1 and FET2 to the common line in series, it becomes difficult for body diodes of the transistors FET1 and FET2 indicated by dotted lines in FIG. 3 to form a discharge loop of the smoothing capacitor C1 when an instantaneous cutoff of the input power supply Ei occurs. For this reason, the voltage of the smoothing capacitor C1 will not decrease rapidly. Hence, when the input power supply Ei resumes power, there is no increase in the voltage applied to the smoothing capacitor C1, thereby making it possible to suppress the generation of a rush current.

One end of the input voltage detection circuit 3 may be connected to one end of the input power supply Ei, and the gates G of the two transistors FET1 and FET2 which have the sources S thereof connected may be connected to the other end of the input voltage detection circuit 3. In addition, the drain D of one of the two transistors FET1 and FET2 may be connected to the other end of the input power supply Ei, and the drain D of the other of the two transistors FET1 and FET2 may be connected to one end of the smoothing capacitor C1. Furthermore, the rapid discharge and delay circuit 2 may be made up of a first resistor, a series circuit and a capacitor which are connected in parallel between the gates G and the sources S of the two transistors FET1 and FET2, where the series circuit is made up of at least a transistor and a second resistor, and a base of the transistor is connected to one end of the capacitor via the first resistor. In this case, it is possible to reduce the discharge current when the instantaneous cutoff of the input power supply Ei occurs. Furthermore, it is possible to reduce the discharge current when the input power supply Ei resumes power after an instantaneous cutoff of the input power supply Ei occurs.

Alternatively, the rapid discharge and delay circuit 2 may be made up of a diode, a first resistor, a series circuit and a capacitor which are connected in parallel between the gates G and the sources S of the two transistors FET1 and FET2, where the series circuit is made up of at least a transistor and a second resistor, the diode is connected between a base and an emitter of the transistor, and the base of the transistor is connected to one end of the capacitor via the first resistor. In this case, it is possible to gradually turn ON the transistor, and to rapidly turn OFF the two transistors FET1 and FET2.

Figure 4:
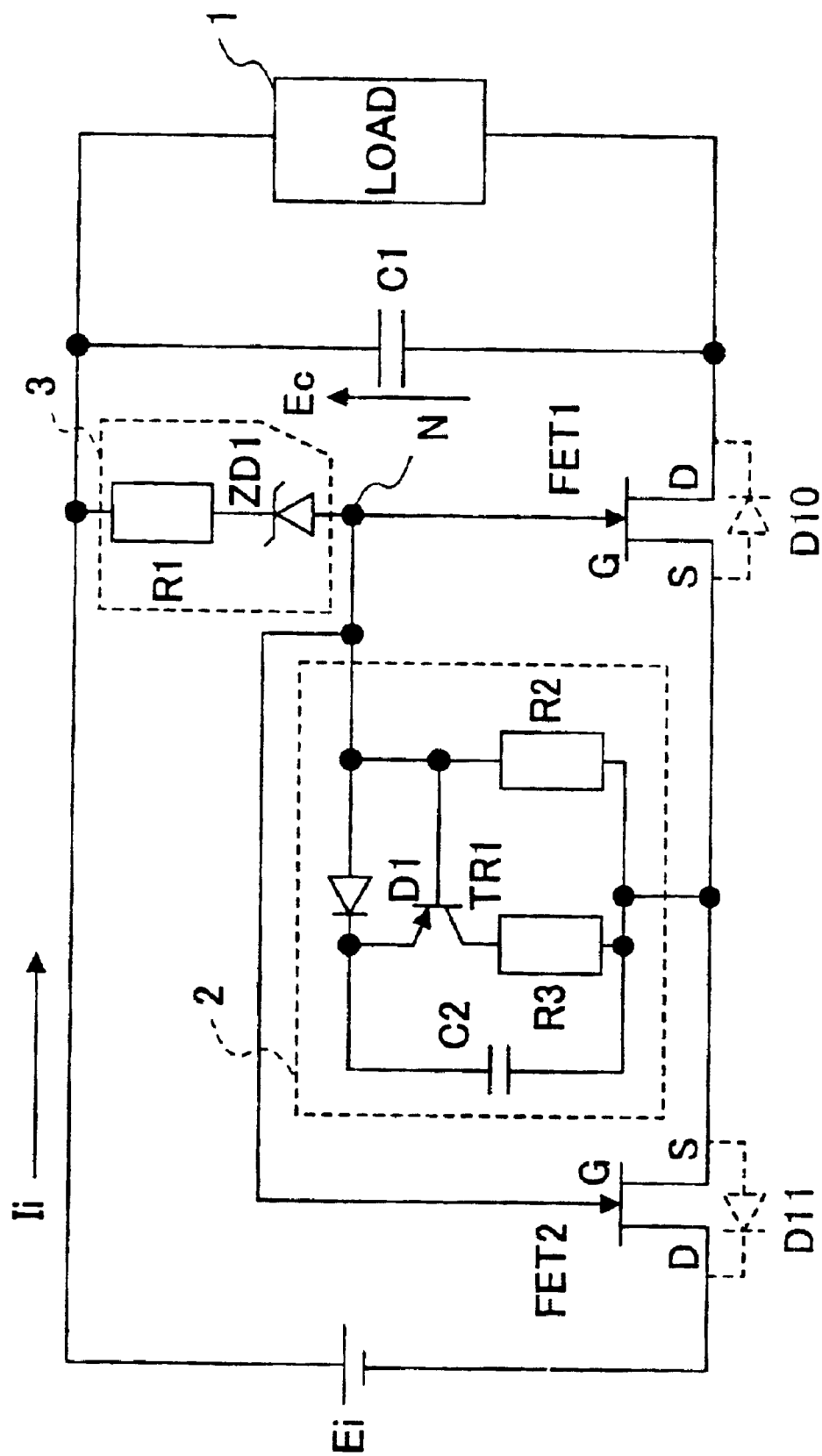
FIG. 4 is a circuit diagram showing an embodiment of the rush current suppression circuit according to the present invention.

Next, a description will be given of an embodiment of the rush current suppression circuit according to the present invention, by referring to FIGS. 4 and 5. FIG. 4 is a circuit diagram showing this embodiment of the rush current suppression circuit. In FIG. 4, those parts which are the same as those corresponding parts in FIG. 3 are designated by the same reference numerals, and a description thereof will be omitted.

In this embodiment, two transistors FET1 and FET2 are connected in series to a common line which forms a current loop, so that sources S of the two transistors FET1 and FET2 are connected to each other. A rapid discharge and delay circuit 2 has a construction identical to that shown in FIG. 1. In other words, the rapid discharge and delay circuit 2 is made up of a diode D1, a capacitor C2, a transistor TR1, and transistors R2 and R3 which are connected as shown in FIG. 4.

An input voltage detection circuit 3 is made up of a series circuit in which a resistor R1 and a Zenner diode ZD1 are connected in series, and an anode of the Zenner diode ZD1 is connected to the rapid discharge and delay circuit 2 via a node N. The node N is connected to gates G of the transistors FET1 and FET2. Body diodes D10 and D11 of the transistors FET1 and FET2 are connected in the directions indicated by dotted lines in FIG. 4. In other words, polarities of the body diode D10 of the transistor FET1 and the body diode D11 of the transistor FET2 are mutually opposite.

A smoothing capacitor C1 is connected to an output end of a power supply circuit as shown in FIG. 4, and a voltage Ec generated across both ends of the smoothing capacitor C1 is applied to a load 1.

A description will now be given of the operation of the power supply circuit shown in FIG. 4, by referring to FIG. 5. FIG. 5 is a timing chart for explaining signal waveforms at various parts of the circuit shown in FIG. 4. In FIG. 5, (a) shows the input power supply voltage Ei, (b) shows the output voltage Ec, (c) shows a voltage VC2 applied to the capacitor C2, and (d) shows a load current Ii.

(1) When Input Power Supply Voltage Ei Is Applied:

When the input power supply voltage Ei is applied to the circuit at a time t1 as shown in FIG. 5(a), the input power supply voltage Ei is applied to the gates G of the transistors FET1 FET2 via the resistor R1 and the Zenner diode ZD1. At the same time, a voltage VC2 applied on the capacitor C2 of the rapid discharge and delay circuit 2 gradually increases as shown in FIG. 5(c) because charges are gradually supplied to the capacitor C2. The voltage VC2 of the capacitor C2 is applied to the transistors FET1 as a gate voltage VGS.

When the gate voltage VGS exceeds a level which turns the transistors FET1 and FET2 ON at a time t2, the transistors FET1 and FET2 turn ON as shown in FIG. 5(b). Hence, a rush current is suppressed by turning ON the transistors FET1 and FET2 after a delay time from the time t1 when the input power supply voltage Ei is applied. As a result, a charging current starts to flow to the smoothing capacitor C1, and the output voltage Ec increases as shown in FIG. 5(b). Consequently, an excessively large rush current flows as the load current Ii, as shown in FIG. 5(d).

(2) When Instantaneous Cutoff of Input Power Supply (Instantaneous Short-Circuit Failure of Input Power Supply Ei) Occurs:

At a time t3 shown in FIG. 5(a), both ends of the input power supply Ei are short-circuited and the input power supply voltage Ei becomes zero. In this state, the charge accumulated in the smoothing capacitor C1 is discharged. A discharge loop of this discharge includes the input power supply Ei and internal diodes of the transistors FET1 and FET2, that is, the body diodes D10 and D11 of the transistors FET1 and FET2 indicated by a dotted line in FIG. 4. But because the polarities of the body diodes D10 and D11 are mutually opposite, it is difficult for the charge accumulated in the smoothing capacitor C1 to discharge. Hence, the decrease in the output voltage Ec due to the discharge of the smoothing capacitor C1 is small as shown in FIG. 5(b). In addition, a peak current flows in a reverse direction as shown in FIG. 5(d) in the load current Ii at the time of the instantaneous cutoff of the input power supply Ei, but this peak current in the reverse direction (reverse input current) is also small.

At the same time, when the charged voltage of the smoothing capacitor C1 becomes less than or equal to a Zenner voltage of the Zenner diode ZD1, the transistor TR1 of the rapid discharge and delay circuit 2 turns ON. Hence, the rapid discharge and delay circuit 2 operates as a rapid discharge circuit, and rapidly discharges the charge accumulated in the capacitor C2. As a result, the gate voltage VGS is rapidly discharged to zero as shown in FIG. 5(c), and the charge accumulated in capacitance between the gate G and the source S of each of the transistors FET1 and FET2 is rapidly discharged, to thereby rapidly turn OFF the transistors FET1 and FET2. Consequently, the charged voltage of the smoothing capacitor C1 does not decrease by a large amount, as may be seen from FIG. 5(b).

Figure 2:
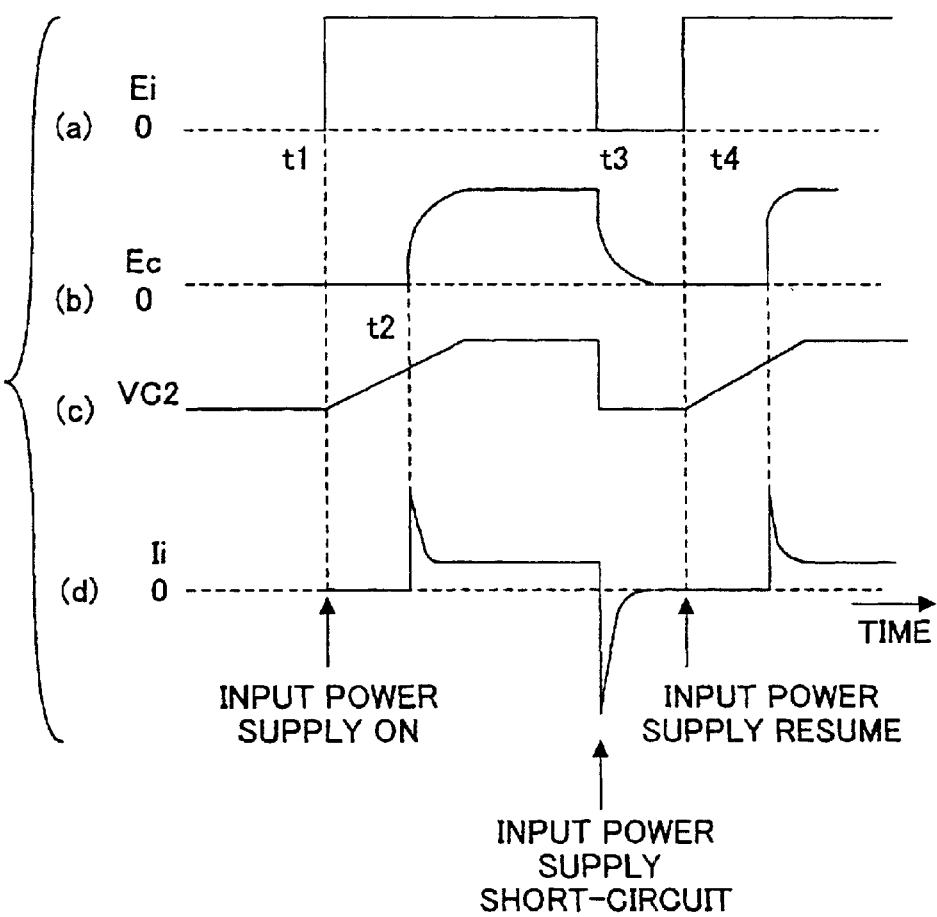
FIG. 2 is a timing chart for explaining signal waveforms at various parts of a power supply circuit shown in FIG. 1.

(3) When Input Power Supply Resumes Power:

It is assumed that the input power supply Ei is resumes power at a time t4. Since a potential difference between the input power supply voltage Ei and the voltage applied across both ends of the smoothing capacitor C1 is small in this state, the value of a peak current which flows at the time when the input power supply Ei resumes power is sufficiently small, as may be seen from FIG. 5(d), when compared to FIG. 2(d).

Therefore, according to this embodiment, it becomes difficult for the body diodes D10 and D11 of the transistors FET1 and FET2 to form the discharge loop of the smoothing capacitor C1 at the time of the instantaneous cutoff of the input power supply Ei, and the voltage of the smoothing capacitor C1 will not decrease rapidly, because the two transistors FET1 and FET2 are connected in series to the common line. Hence, when the input power supply Ei resumes power, the increase in the voltage applied to the smoothing capacitor C1 is small, to thereby enable the rush current to be suppressed.

In addition, this embodiment only requires a small transient power when the input power supply Ei resumes power, and the scale of the required power equipments of the supply source (source power supplying end) can be reduced.

Therefore, since the rush current of the load current Ii can be reduced in this embodiment, it is possible to reduce the undesirable effects of the rush current to other apparatuses. Moreover, it is also possible to reduce stress on electrical parts and components, such as capacitors and field effect transistors.

Further, the present invention is not limited to these embodiments, but various variations and modifications may be made without departing from the scope of the present invention.

What is claimed is:

1. A rush current suppression circuit adapted to a power supply circuit which includes a common line and an input voltage detection circuit and supplies power from an input power supply via a switching circuit, said rush current suppression comprising:

a smoothing capacitor coupled to an output end of the power supply circuit; and a rapid discharge and delay circuit, coupled to the input voltage detection circuit, carrying out a rapid discharge and a time delay and controlling the switching circuit, said switching circuit including first and second field effect transistors which are coupled in series to the common line of the power supply circuit, said first and second field effect transistors having sources which are coupled to each other and gates which are coupled to each other and driven by said rapid discharge and delay circuit.

2. The rush current suppression circuit as claimed in claim 1, wherein:

one end of the input voltage detection circuit is coupled to one end of the input power supply, gates of the first and second field effect transistors are coupled in common to the other end of the input voltage detection circuit, the drain of the first second field effect transistor is coupled to one end of said smoothing capacitor, the drain of the second field effect transistor is coupled to the other end of the input power supply, and said rapid discharge and delay circuit includes a first resistor, a series circuit having a transistor and a second resistor coupled in series, and a capacitor coupled in parallel with the series circuit, wherein the first resistor is coupled between a base of the transistor and one end of the capacitor.

3. The rush current suppression circuit as claimed in claim 2, wherein said capacitor is coupled in parallel with the series circuit between the gates and the sources of the first and second field effect transistors.

4. The rush current suppression circuit as claimed in claim 1, wherein said rapid discharge and delay circuit includes:

a first resistor;

a series circuit having a transistor and a second resistor coupled in series;

a capacitor coupled in parallel with the series circuit, and a diode coupled between an emitter and a base of the transistor, wherein the first resistor is coupled between the base of the transistor and one end of the capacitor.

5. The rush current suppression circuit as claimed in claim 4, wherein said capacitor is coupled in parallel with the series circuit between the gates and the sources of the first and second field effect transistors.

6. A rush current suppression circuit connectable to a power supply circuit which is provided with a common line and an input voltage detection circuit and supplies power from an input power supply, said rush current suppression comprising:

a smoothing capacitor which is coupled to an output end of the power supply circuit;

a rapid discharge and delay circuit which is coupled to the input voltage detection circuit and carries out a rapid discharge and a time delay; and a switching circuit through which the power from the input power supply is supplied under control of said rapid discharge and delay circuit, said switching circuit including first and second field effect transistors which are coupled in series to the common line of the power supply circuit, said first and second field effect transistors having sources which are coupled to each other and gates which are coupled to each other and driven by said rapid discharge and delay circuit.

7. The rush current suppression circuit as claimed in claim 6, wherein one end of the input voltage detection circuit is coupled to one end of the input power supply, and sources of the first and second field effect transistors are coupled in common to the other end of the input voltage detection circuit, the drain of the first second field effect transistor being coupled to one end of said smoothing capacitor, the drain of the second field effect transistor being coupled to the other end of the input power supply, said rapid discharge and delay circuit comprising a first resistor, a series circuit having a transistor and a second resistor coupled in series, and a capacitor coupled in parallel with the series circuit, wherein the first resistor is coupled between a base of the transistor and one end of the capacitor.

8. The rush current suppression circuit as claimed in claim 7, wherein said capacitor is coupled in parallel with the series circuit between the gates and the sources of the first and second field effect transistors.

9. The rush current suppression circuit as claimed in claim 6, wherein said rapid discharge and delay circuit comprises:

a first resistor;

a series circuit having a transistor and a second resistor coupled in series;

a capacitor coupled in parallel with the series circuit, and a diode coupled between an emitter and a base of the transistor, wherein the first resistor is coupled between the base of the transistor and one end of the capacitor.

10. The rush current suppression circuit as claimed in claim 9, wherein said capacitor is coupled in parallel with the series circuit between the gates and the sources of the first and second field effect transistors.

* * * * *